(12) United States Patent
Griffin

(10) Patent No.: US 11,246,679 B2
(45) Date of Patent: Feb. 15, 2022

(54) DEVICE FOR HOLDING MEDICAL INSTRUMENTS AND METHOD OF USING SAME

(71) Applicant: Practicon, Inc., Greenville, NC (US)

(72) Inventor: Bradley P. Griffin, Greenville, NC (US)

(73) Assignee: Practicon, Inc., Greenville, NC (US)

( * ) Notice: Subject to any disclaimer, the term of this patent is extended or adjusted under 35 U.S.C. 154(b) by 0 days.

(21) Appl. No.: 16/815,087

(22) Filed: Mar. 11, 2020

(65) Prior Publication Data

US 2020/0306009 A1 Oct. 1, 2020

Related U.S. Application Data

(60) Provisional application No. 62/823,797, filed on Mar. 26, 2019.

(51) Int. Cl.
*A61C 1/14* (2006.01)

(52) U.S. Cl.
CPC .............. *A61C 1/145* (2013.01); *A61C 1/144* (2013.01); *A61C 1/147* (2013.01)

(58) Field of Classification Search
CPC ..... A61C 1/144–147; A61C 1/14; A61C 3/04; B25H 3/003
USPC .......................................................... 433/25
See application file for complete search history.

(56) References Cited

U.S. PATENT DOCUMENTS

| | | | | |
|---|---|---|---|---|
| 337,888 | A * | 3/1886 | Swan ..................... | B25H 3/003 206/379 |
| 1,927,110 | A * | 9/1933 | Bannister ................. | B25H 3/02 206/379 |
| 2,880,857 | A * | 4/1959 | Parsons .................. | B25H 3/003 206/379 |
| 3,154,192 | A * | 10/1964 | Cowley .................. | B65D 85/24 206/379 |
| 4,260,057 | A * | 4/1981 | Wall-Andersen ...... | B65D 85/20 206/379 |
| 4,619,364 | A * | 10/1986 | Czopor, Jr. ............ | B25H 3/003 206/379 |
| 5,006,066 | A * | 4/1991 | Rouse ...................... | A61C 3/04 206/369 |
| 5,098,235 | A * | 3/1992 | Svetlik ................... | B25H 3/003 206/379 |
| D368,532 | S | 4/1996 | Jonkman | |
| 5,692,609 | A * | 12/1997 | Lin ........................ | A61C 19/02 206/368 |
| D400,709 | S * | 11/1998 | Chang ............................ | D3/294 |

(Continued)

OTHER PUBLICATIONS

Practicon, "Practicon Bur Safe Bur Holders", reference dated Aug. 27, 2020 found by RMS on the internet at https://www.practicon.com/bursafe-bur-holders/p/7039730.

*Primary Examiner* — Matthew M Nelson
(74) *Attorney, Agent, or Firm* — Ward and Smith, P.A.; Ryan K. Simmons

(57) ABSTRACT

A holder for medical/dental instruments and method of using the holder. The holder may include a body, including a first surface and a second surface. The holder may further include a ridge formed along a length of the first surface of the body; a wall portion formed along the length of the first surface of the body and extending vertically therefrom, wherein the wall portion may be parallel to and spaced apart from the ridge; and a plurality of grooves formed in the ridge.

20 Claims, 16 Drawing Sheets

(56) References Cited

U.S. PATENT DOCUMENTS

| | | | | |
|---|---|---|---|---|
| D432,790 S | * | 10/2000 | Streich | D3/315 |
| 6,131,740 A | * | 10/2000 | Huang | B25H 3/003 206/372 |
| 6,360,051 B1 | | 3/2002 | Daoud | |
| 6,405,864 B1 | * | 6/2002 | Streich | A45C 5/00 206/373 |
| 6,450,328 B1 | * | 9/2002 | Machacek | A61C 19/02 206/45.2 |
| D475,853 S | * | 6/2003 | Chen | D3/294 |
| D488,054 S | | 4/2004 | Myers | |
| 6,793,078 B2 | * | 9/2004 | Roshdy | B65D 1/36 206/366 |
| 6,801,704 B1 | | 10/2004 | Daoud | |
| D644,501 S | | 9/2011 | Chen | |
| D657,869 S | | 4/2012 | Mammen | |
| D743,048 S | | 11/2015 | Kuran | |
| 9,238,301 B2 | * | 1/2016 | Streich | A45C 5/00 |
| D755,043 S | | 5/2016 | Bailey | |
| D777,254 S | | 1/2017 | Condren | |
| 9,575,278 B2 | | 2/2017 | Leclerc | |
| D782,024 S | | 3/2017 | Murphy | |
| 9,618,143 B2 | | 4/2017 | Noble | |
| D790,127 S | | 6/2017 | Verleur | |
| D853,336 S | | 7/2019 | Barram | |
| D886,992 S | | 6/2020 | Kindler | |
| D903,901 S | | 12/2020 | Griffin | |
| D910,872 S | | 2/2021 | White | |
| D930,459 S | | 9/2021 | Breines | |
| 2004/0118982 A1 | | 6/2004 | Shillings | |
| 2007/0104609 A1 | | 5/2007 | Powell | |
| 2007/0235597 A1 | | 10/2007 | Winchester | |
| 2011/0147542 A1 | | 6/2011 | Hoek | |
| 2013/0299371 A1 | * | 11/2013 | Johansson | B65D 85/24 206/349 |
| 2014/0064868 A1 | * | 3/2014 | Clark | B25H 3/003 408/241 B |
| 2014/0339114 A1 | | 11/2014 | Griffin | |
| 2017/0014988 A1 | * | 1/2017 | Yeh | B25H 3/04 |
| 2018/0311810 A1 | * | 11/2018 | Larsson | A45F 5/021 |
| 2020/0306009 A1 | | 10/2020 | Griffin | |
| 2020/0324399 A1 | * | 10/2020 | Christen | B25H 3/003 |

\* cited by examiner

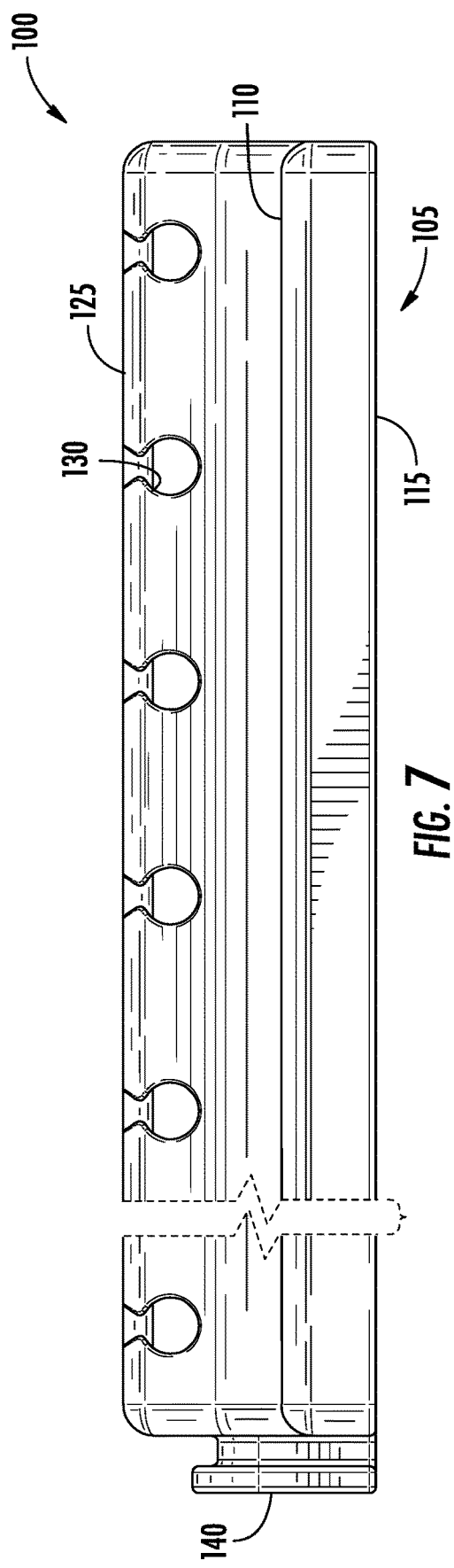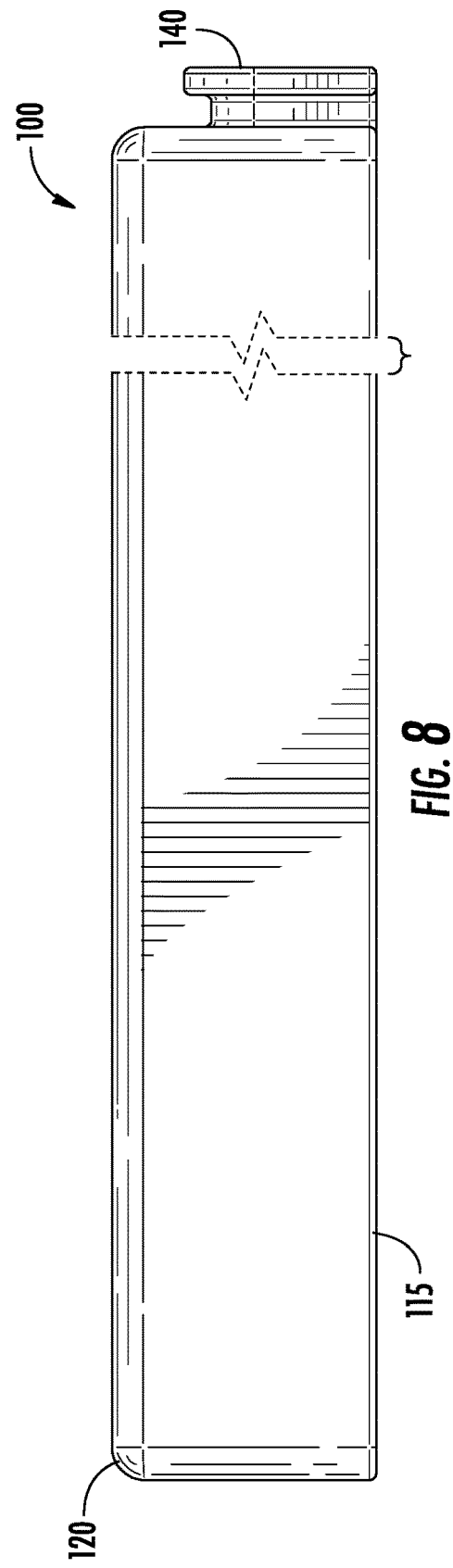

DEVICE FOR HOLDING MEDICAL INSTRUMENTS AND METHOD OF USING SAME

RELATED APPLICATIONS

This application claims priority to and incorporates herein by reference related U.S. Provisional Patent Application No. 62/823,797 filed on Mar. 26, 2019.

TECHNICAL FIELD

The subject matter disclosed herein relates generally to a holder for medical instruments, such as dental burs.

BACKGROUND

Traditional holders for medical instruments, such as those used for holding dental burs, are configured to vertically store the dental burs close to one another with the sharp end faced up. When dental burs are stored vertically and close together, it is difficult to grab one without contacting the sharp ends of the other burs. Thus, there is an increased risk of injury from inadvertently puncturing one's finger on an adjacent bur when reaching to pull one out. Some dental bur holders can fold flat (horizontal) for sterilization, but open to a vertical position when in use, which makes them easy to sterilize, but still presents the risk of a stick injury since the burs are ultimately presented vertically for retrieval. Further, typical dental bur holders include a hard covers and/or folding guards to protect the sharp (working) end of the bur; however, these hard covers and/or folding guards do not allow for burs of various lengths to be stored in the same holder. Often short burs fall out of bur holders made for longer burs, or if the holder is designed for short burs, those holders do not allow longer burs to fit into the holder. Thus, multiple bur holders may be required to hold burs of various lengths.

Therefore, there is a need for a holder that reduces/eliminates the risk of injury from a user inadvertently being injured (e.g., puncturing a finger) when retrieving, for example, a dental bur from its holder. In addition, there is a need for a holder that can accommodate and securely hold instruments, such as dental burs of varying sizes.

SUMMARY

In one embodiment, a holder for medical/dental instruments is disclosed. The holder may include a body, including a first surface and a second surface. The holder may further include a ridge formed along a length of the first surface of the body; a wall portion formed along the length of the first surface of the body and extending vertically therefrom, wherein the wall portion may be parallel to and spaced apart from the ridge; and a plurality of grooves formed in the ridge. The holder may include one of a flexible or semi-flexible material. The holder of claim 1 wherein the second surface is substantially flat. The wall may be disposed at a side most edge of the first surface. The ridge may be disposed substantially along a mid-point of the first surface. The ridge and the wall portion may extend vertically substantially the same height from the first surface. The plurality of grooves may be configured to accept a medical instrument and retain it therein in a substantially horizontal position relative to the first surface. A bottom most portion of the plurality of grooves may be spaced a distance above the first surface. The grooves may be configured to retain a medical instrument in a horizontal position relative to the first surface such that a mid portion of the medical instrument is supported in one of the grooves while an end portion of the medical instrument is elevated a distance above the first surface, and wherein the medical instrument is orientated perpendicular relative to the ridge and the wall portion. When retained in one of the grooves the end portion of the medical instrument may be proximate to a vertical face of the wall portion. The plurality of grooves may include a material comprising sufficient elasticity to releasable grip a medical instrument retained therein. The holder may further include one or more interlocking structures disposed at one or both of a first end of the body and a second end of the body opposing the first end. The body may include a first one of the one or more interlocking structures at the first end of the body and second one of the one or more interlocking structures at the second end of the body. The first one of the one or more interlocking structures may be configured as a female interlocking structure and the second one of the one or more interlocking structures may be configured as a corresponding male interlocking structure. The first one of the one or more interlocking structures and the second one of the one or more interlocking structures may be disposed in the first end and the second end of the body respectively, such that they are aligned with the first ridge. The multiple bodies may be interlockable together via the one or more interlocking structures. The first one of the one or more interlocking structures of a first holder may be configured to interlocking with the second one of the one or more interlocking structure of a second holder. When multiple bodies are interlocked together the first ridge of the interlocked bodies may be substantially aligned. The bodies may be color coded.

In another embodiment, a method of removing a medical instrument from a holder is provided. The method may include providing a holder. The holder may include a body, the body including a first surface and a second surface; a ridge formed along a length of the body first surface; a wall portion formed along the length of the first surface of the body and extending vertically therefrom, wherein the wall portion may be parallel to and spaced apart from the ridge; a plurality of grooves formed in the first ridge; and one or more medical instrument retained in one or more of the plurality of grooves. The method may further include, selecting one of the one or more medical instruments; pressing down on a first end of the selected medical instrument that is more proximate to the wall portion; grasping a second end of the selected medical instrument opposite that of the first end that extends upward upon pressing down on the first end; and pulling up on the second end to remove the selected medical instrument from the holder.

In yet another embodiment, a method of storing a medical instrument in a holder is provided. The method may include providing a holder. The holder may include a body, the body including a first surface and a second surface; a ridge formed along a length of the body first surface; a wall portion formed along the length of the first surface of the body and extending vertically therefrom, wherein the wall portion may be parallel to and spaced apart from the ridge; a plurality of grooves formed in the first ridge; and one or more medical instrument retained in one or more of the plurality of grooves. The method may further include, selecting one of the one or more medical instruments to be stored in the holder; inserting a stem portion of the selected medical instrument into one of the plurality of grooves, such that the selected medical instrument is substantially perpendicular to the ridge and a head of the selected medical instrument is proximate the wall portion; and pressing down on the stem portion of the selected medical instrument to retain the selected medical instrument in the groove, wherein when retained therein a portion of the stem of the selected medical instrument is cradled in the groove and the head of the selected medical instrument is elevated a distance above the first surface.

BRIEF DESCRIPTION OF THE DRAWINGS

Figure 1:
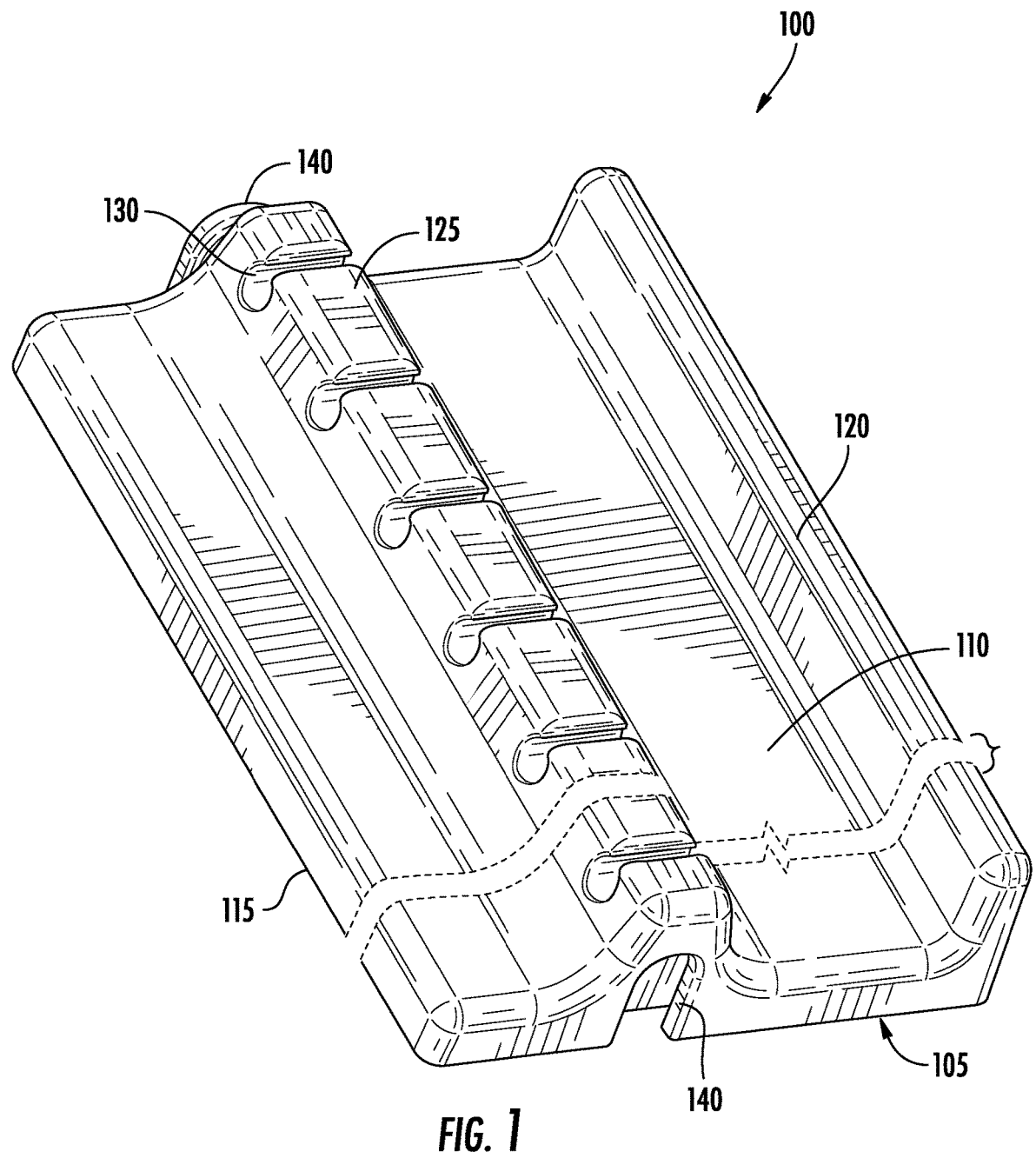
Figure 2:
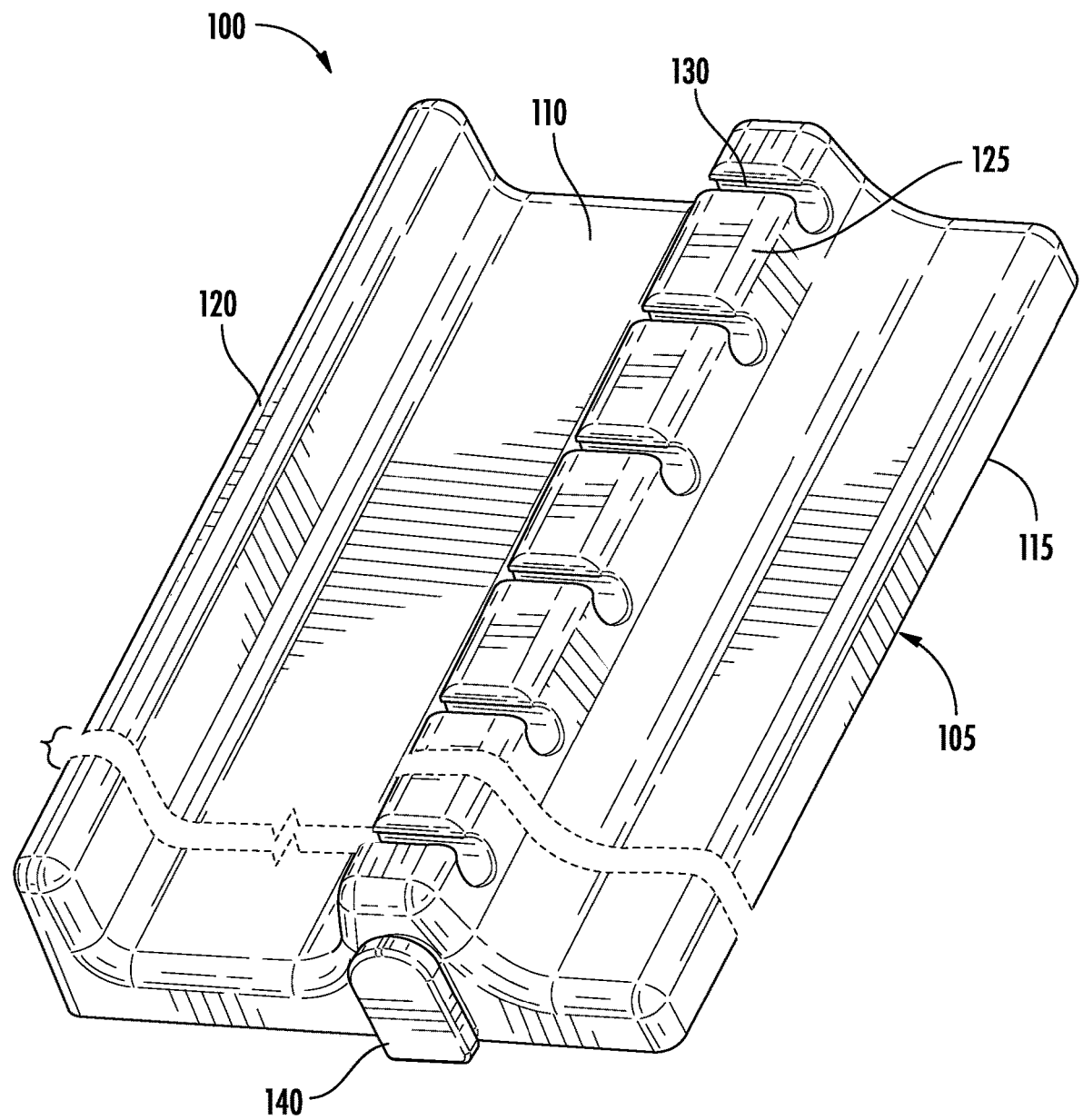
Figure 3:
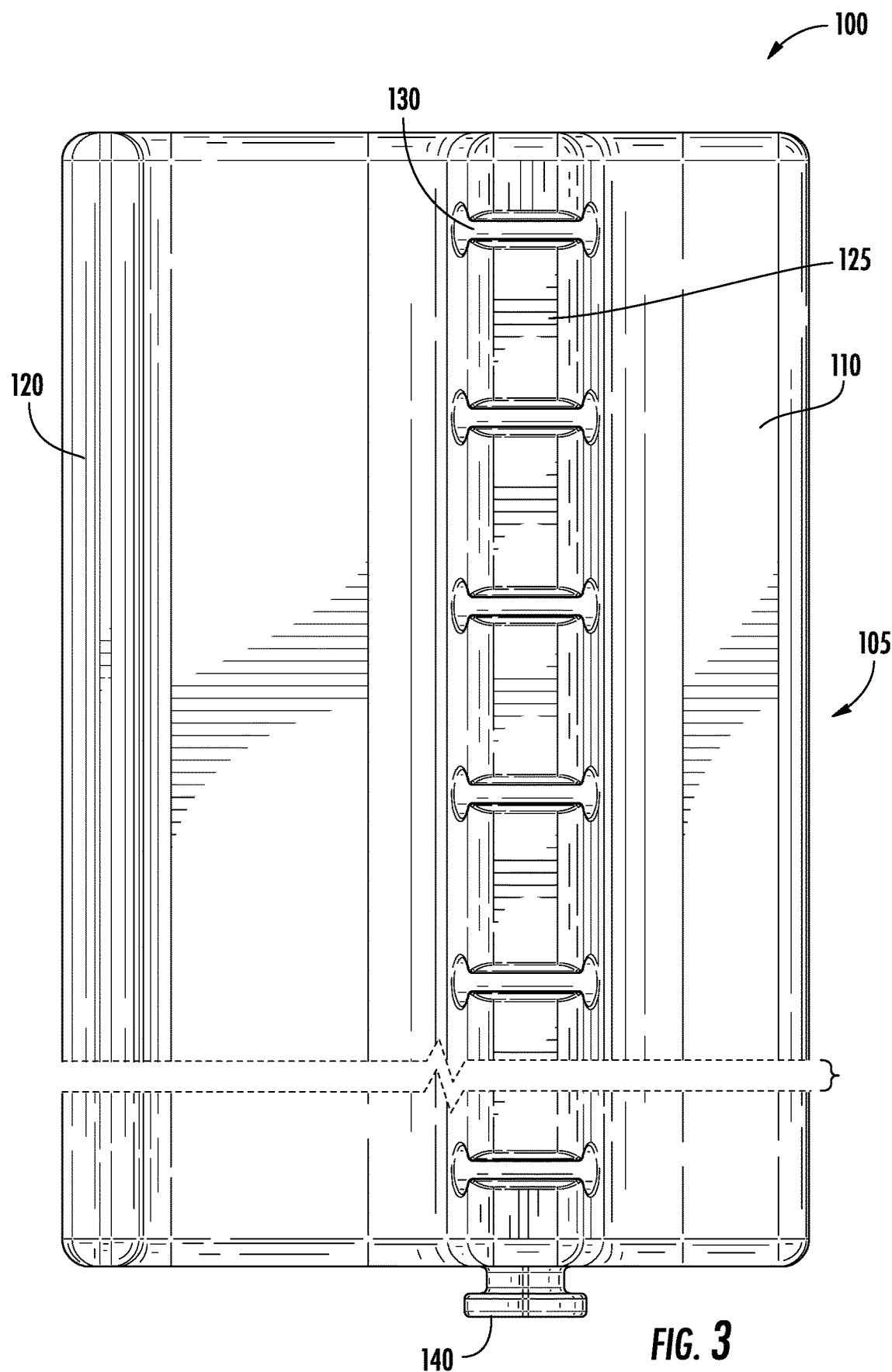
Figure 4:
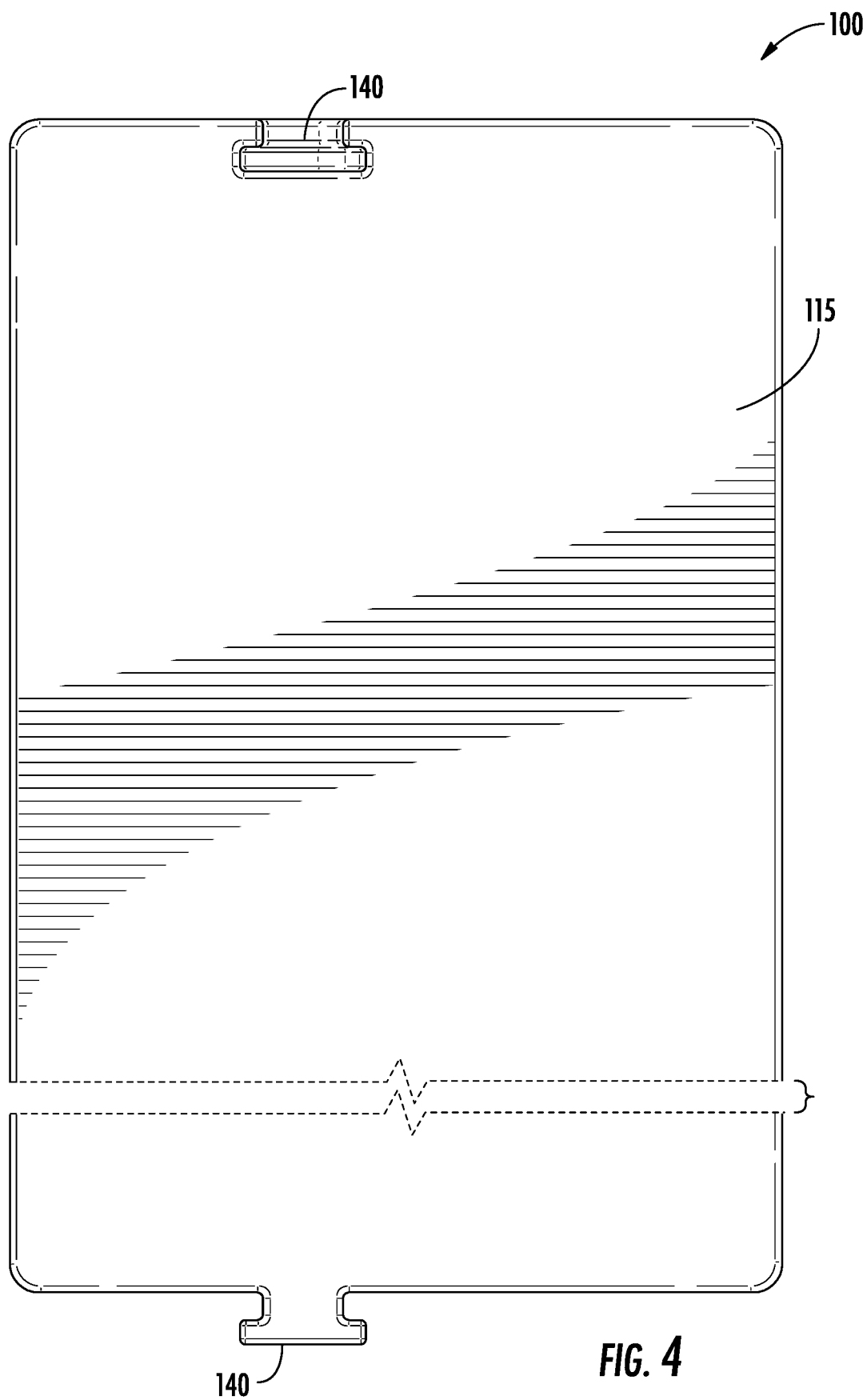
Figure 5:
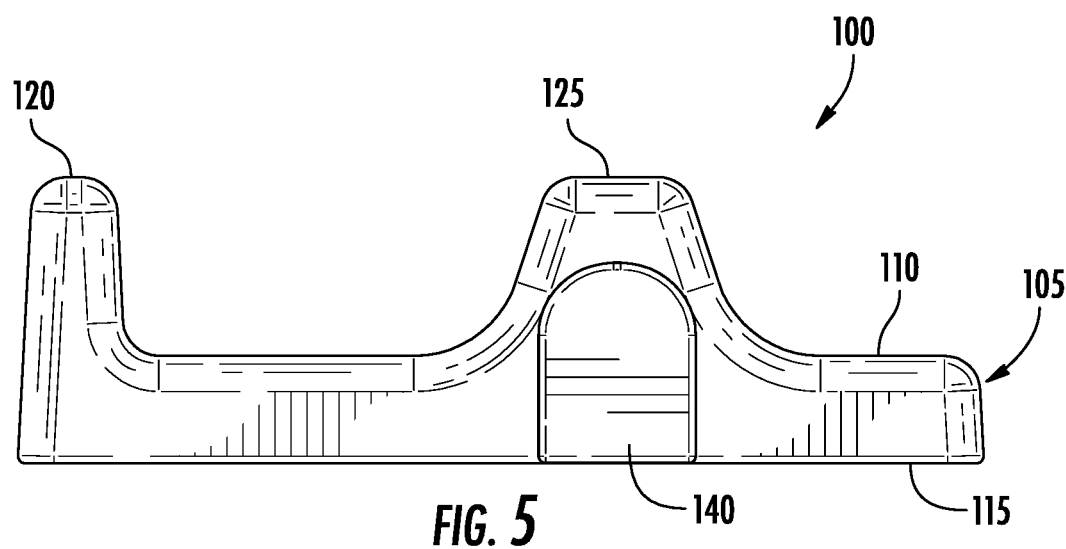
Figure 6:
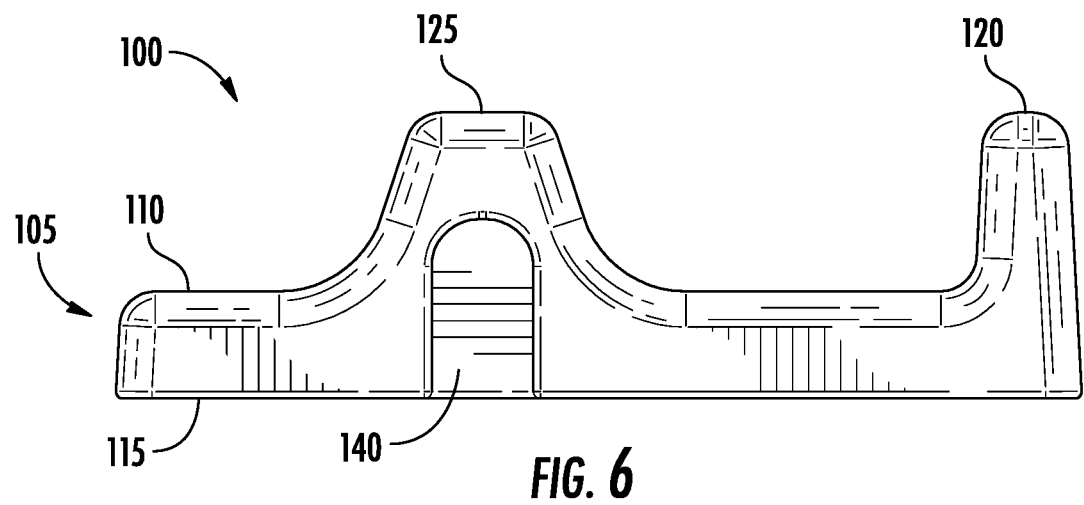
Figure 9:
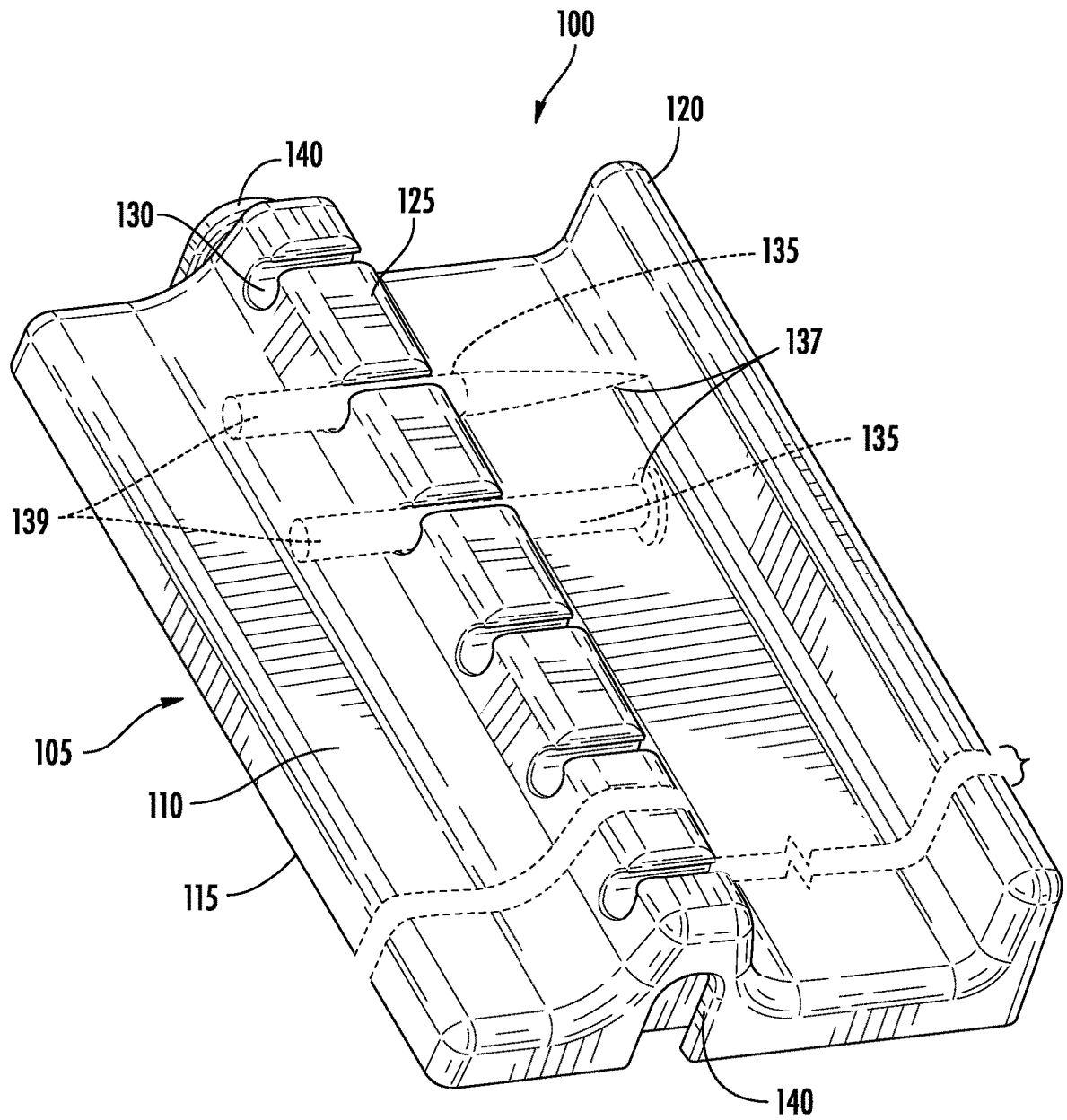
Figure 10:
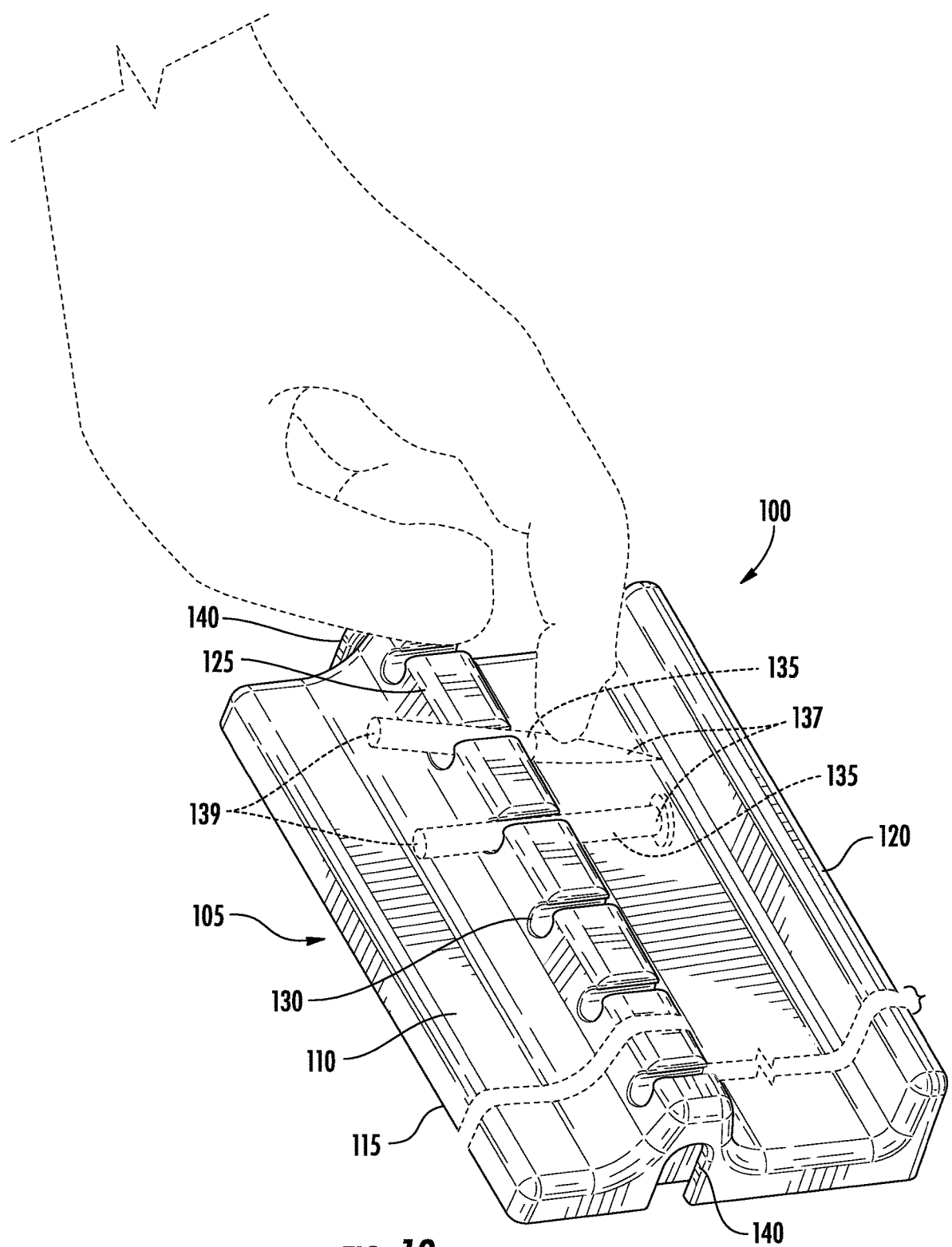
Figure 11:
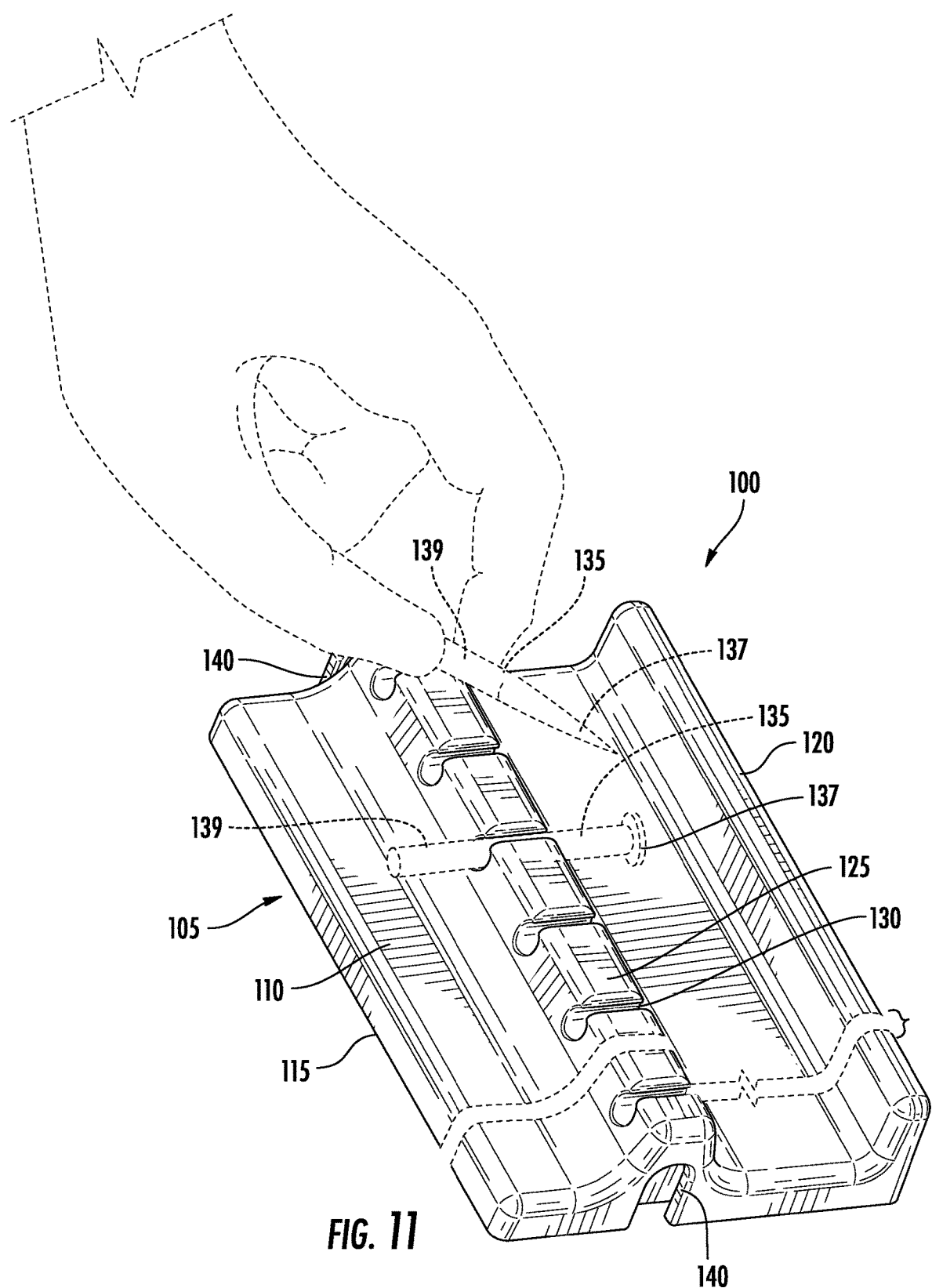
Figure 12:
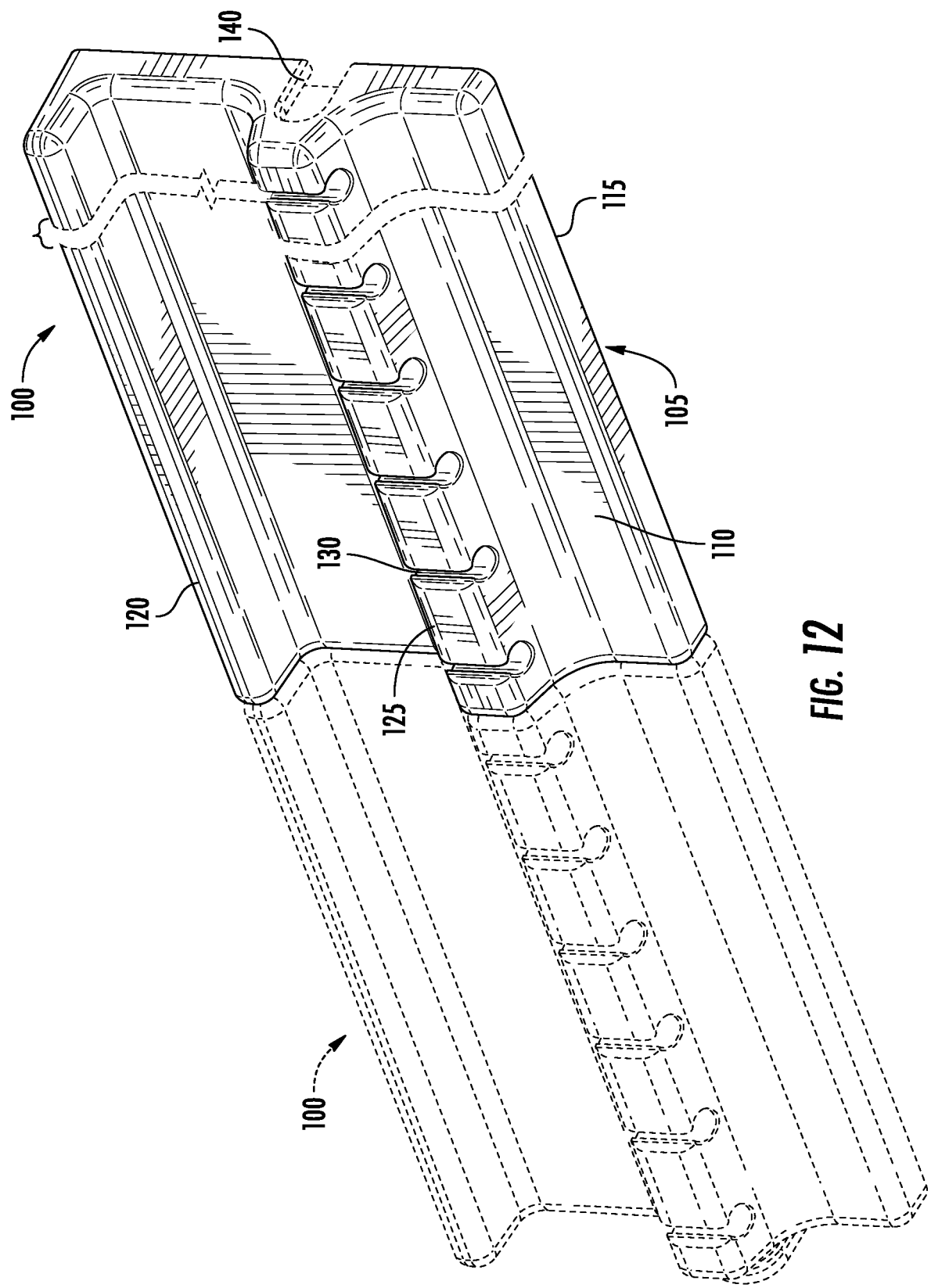
Figure 13A:
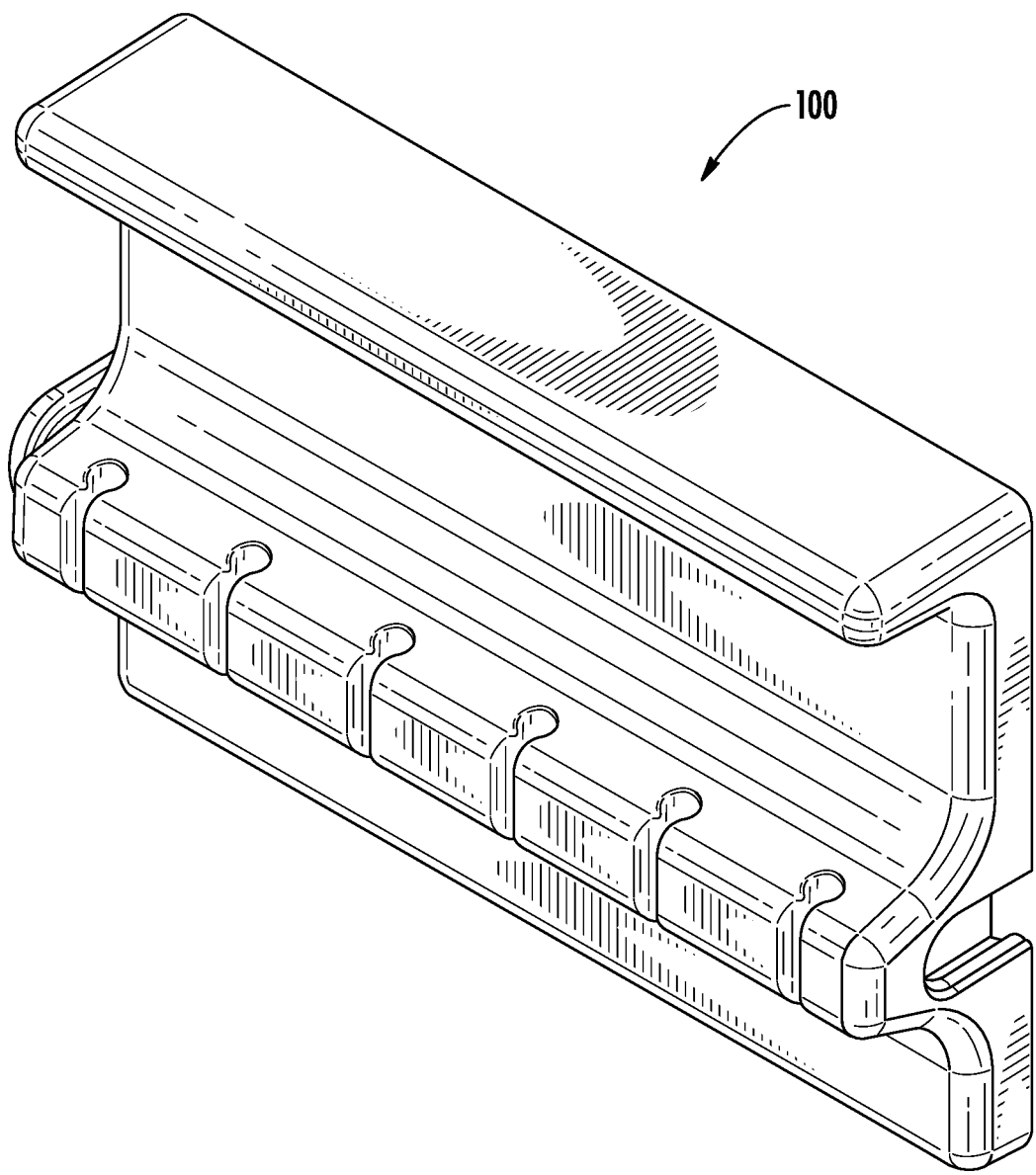
Figure 13B:
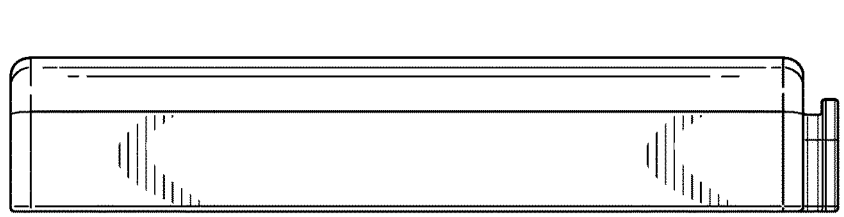
Figure 13C:
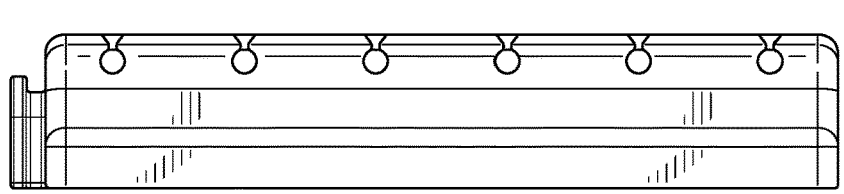
Figure 13D:
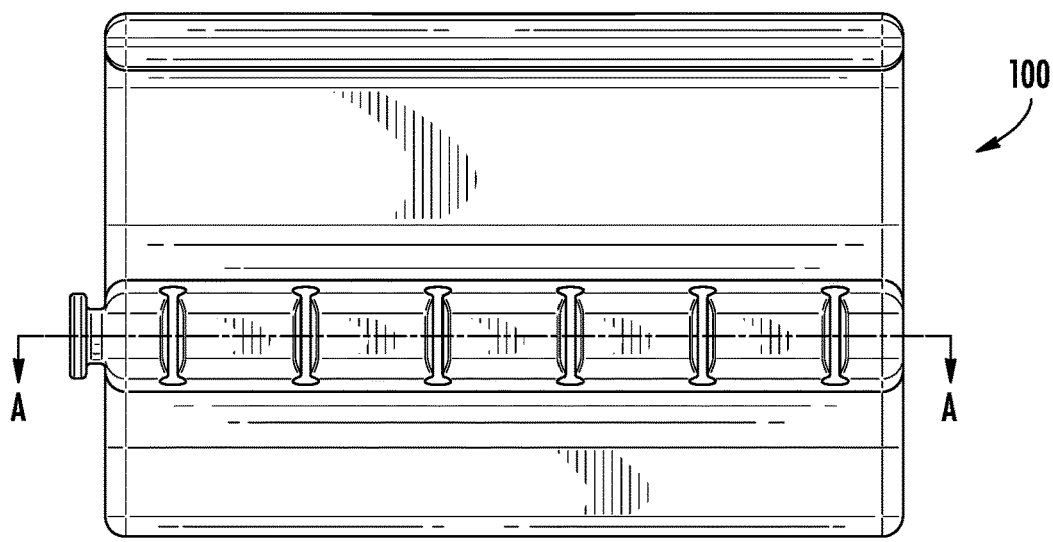
Figure 13E:
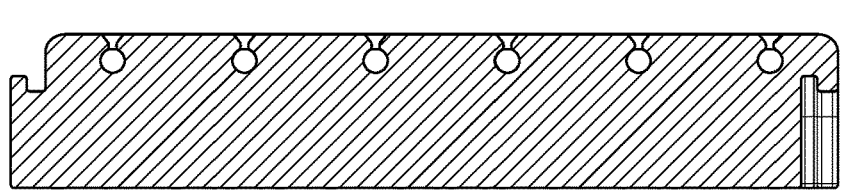
Figure 13F:
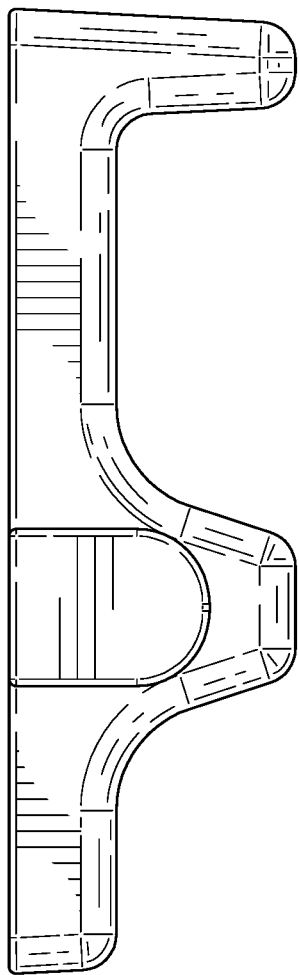
Figure 13G:
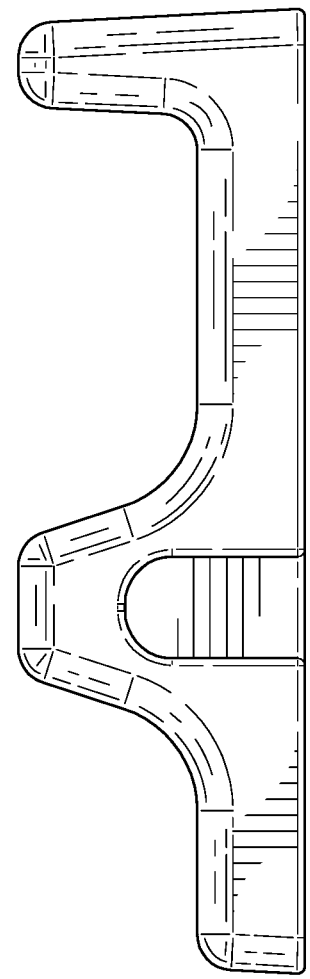
Figure 14A:
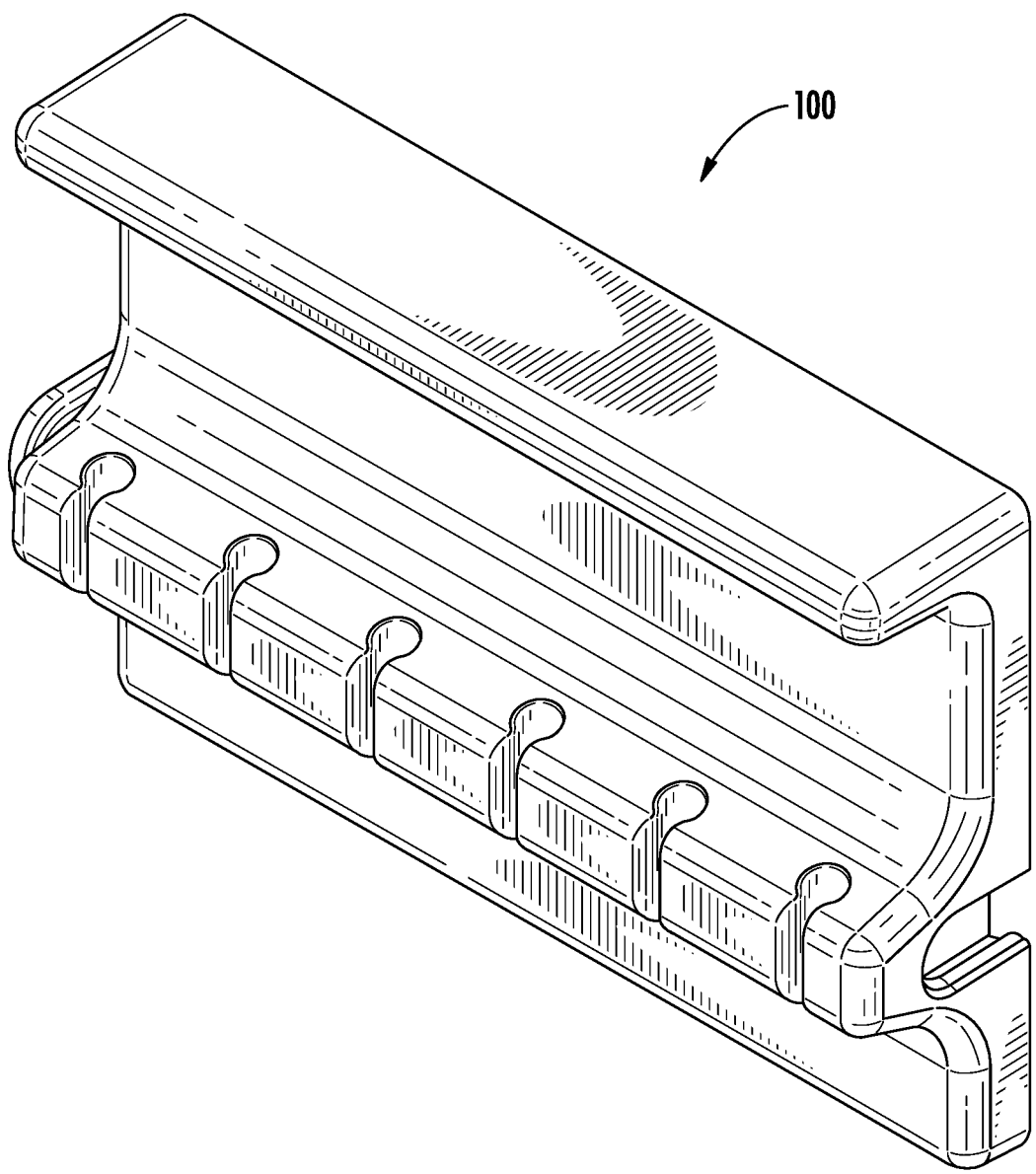
Figure 14B:
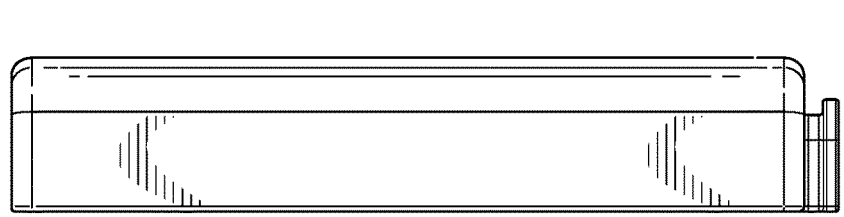
Figure 14C:
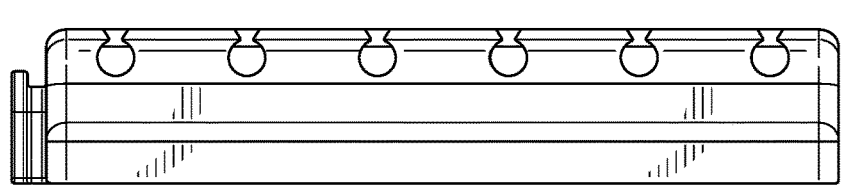
Figure 14D:
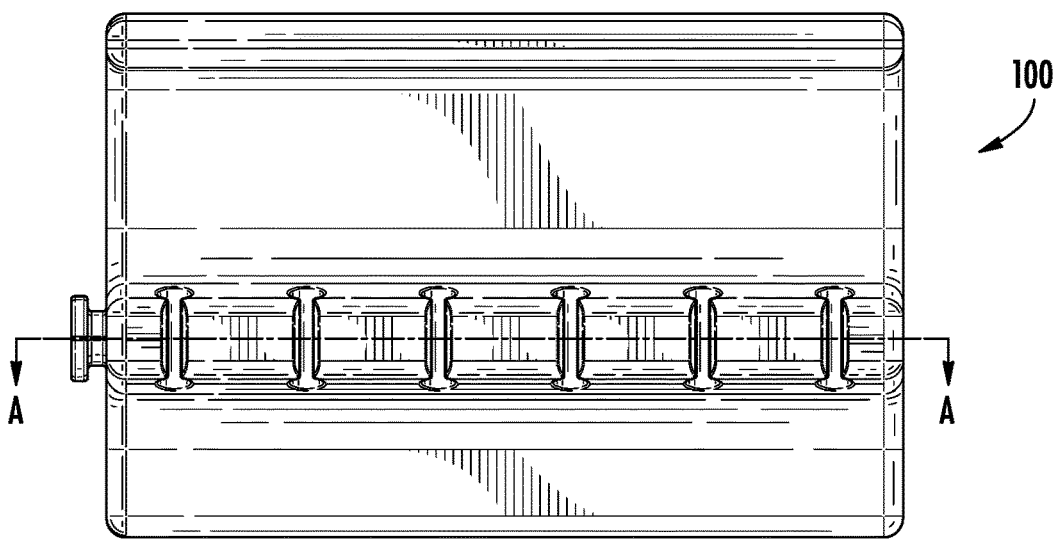
Figure 14E:
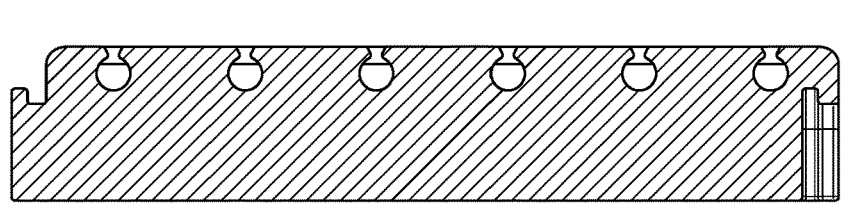
Figure 14F:
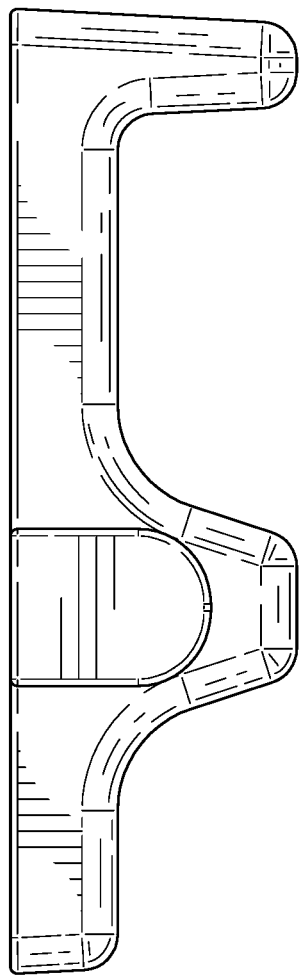
Figure 14G:
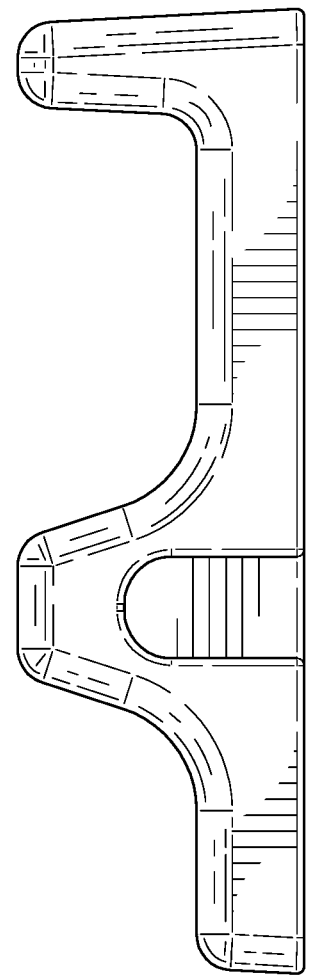

Having thus described the presently disclosed subject matter in general terms, reference will now be made to the accompanying Drawings, which are not necessarily drawn to scale, and wherein:

FIG. 1 illustrates perspective view of a holder for medical instruments in accordance with an embodiment of the invention;

FIG. 2, FIG. 3, FIG. 4, FIG. 5, FIG. 6, FIG. 7, and FIG. 8 illustrate another perspective view, a top view, a bottom view, a first side view, a second side view, a front view, and a rear view, respectively, of the holder shown in FIG. 1;

FIG. 9 illustrates a perspective view of the holder shown in FIG. 1 holding an assortment of dental burs;

FIG. 10 and FIG. 11 illustrate perspective views of an example of a user in the processes of removing a dental bur from the holder shown in FIG. 1;

FIG. 12 illustrates a perspective view of the holder shown in FIG. 1 interlocked with another holder;

FIGS. 13A, 13B, 13C, 13D, 13E, 13F, and 13G illustrate another perspective view, a rear view, a front view, a top view, a cross-section view along A-A, a first side view, and a second side view, respectively, of the holder shown in FIG. 1 in accordance with embodiments of the invention; and FIGS. 14A, 14B, 14C, 14D, 14E, 14F, and 14G illustrate another perspective view, a rear view, a front view, a top view, a cross-section view along A-A, a first side view, and a second side view, respectively, of the holder shown in FIG. 1 in accordance with embodiments of the invention.

DETAILED DESCRIPTION

The subject matter disclosed herein will now be described more fully hereinafter with reference to the accompanying Drawings, in which some, but not all embodiments of the presently disclosed subject matter are shown. Like numbers refer to like elements throughout. The subject matter disclosed herein may be embodied in many different forms and should not be construed as limited to the embodiments set forth herein; rather, these embodiments are provided so that this disclosure will satisfy applicable legal requirements. Indeed, many modifications and other embodiments of the subject matter disclosed herein will come to mind to one skilled in the art to which the subject matter disclosed herein pertains having the benefit of the teachings presented in the foregoing descriptions and the associated Drawings. Therefore, it is to be understood that the subject matter disclosed herein is not to be limited to the specific embodiments disclosed and that modifications and other embodiments are intended to be included within the scope of the appended claims.

In some embodiments, the subject matter disclosed herein provides a holder for medical instruments, In one example, the disclosed subject matter provides a holder for dental instruments, such as dental burs (e.g., friction grip (FG), rotary attachment (RA), etc.), of various sizes, e.g., length and/or shank/stem diameter. For example, a holder is provided that preferably holds medical instruments, such as dental burs, in a horizontal position for both sterilization and retrieval by a user, such as a dentist.

Referring now to FIGS. 1-14, which show varying views of a holder 100, which is one example of a holder for use in sterilizing, storing, transporting, and/or presenting medical instruments, such as dental burs 135, or other types of medical/dental instruments. Holder 100 may be molded or formed in silicone or other suitable material capable of standing up under sterilization (e.g., autoclave) temperatures and conditions. For example, holder 100 may be formed of silicone via a standard molding process, thereby forming a flexible or semi-flexible holder 100. Holder 100 may preferably be, including dental burs 135 arranged thereon, inserted, for example, in a flat sterilization envelop, inserted into a sterilization chamber, and then subsequently placed on a dental tray or counter ready for use by a practitioner.

Holder 100, in one example embodiment, preferably includes a base portion 105. Base portion 105 may include a top surface 110 and a bottom surface 115. Bottom surface 115 is preferably substantially flat; such that the holder 100, when laid on a flat horizontal surface, lays substantial flat thereon.

Base portion 105 may further include a protective end wall 120. Protective end wall 120 preferably extends vertically upward from a side edge of the top surface 110 of base portion 105, and preferably runs a length of the base portion 105. Protective end wall 120 is preferably orientated substantially perpendicular relative to the top surface 110 of base portion 105.

Base portion may further include a center ridge 125. Center ridge 125 preferably extends vertically upward from about a mid portion of the top surface 110 of base portion 105, and preferably runs a length of the base portion 105. In one example, a top surface of the center ridge 125 may be substantially the same height as that of a top edge of the protective end wall 120. A cross section of a portion of the base portion 105 extending from the protective end wall 120 to the center ridge 125, in one example, may have a generally U shape.

Center ridge 125 preferably includes grooves 130. Grooves 130 are preferably configured to hold a medical instrument, such as a dental bur 135, in a horizontal position relative to the top surface 110 of base portion 105 and perpendicular relative to protective end wall 120 and center ridge 125. Center ridge 125 may include multiple grooves 130, in one example center ridge 125 may include six (6) grooves 130. However, center ridge 125 may include more or less than six (6) grooves. Grooves 130 may be of substantially the same size and shape, or may alternatively be of varying sizes and shapes to accommodate medical instruments, e.g., burs, having differing shank diameters. A bottom most portion of grooves 130 preferably extends downward such that the bottom of grooves 130 are spaced a distance above the top surface 110 of the base portion 105. Grooves 130 are preferably configured to hold a medical instrument, such as a dental bur 135, in a horizontal position relative to the top surface 110 of base portion 105, such that a mid portion of the dental bur 135 is supported in one of grooves 130 while each end portion of the dental bur 135 is elevated a distance above the top surface 110 of the base portion 105, and the dental bur 135 is perpendicular to protective end wall 120 and center ridge 125. In one example, a head portion (working/cutting end) 137 of the dental bur 135 when positioned in one of groves 130 would preferably be proximal to the protective end wall 120. Grooves 130 are preferably made of flexible silicone to provide sufficient elasticity to grip the dental bur 135 in place along the center ridge 125, while still allowing for easy release from groove 130 when retrieved by a user, such as dentist or other dental professional. In such an embodiment, by way of gripping the side of the dental burs 135 by grooves 130 along the center ridge 125, an integrated cover or folding guard is not required to keep the dental burs 135 from falling out of the holder 100. Such hard covers and folding guards do not allow for dental burs 135 of various lengths to be arranged in a same holder, that is shorter instruments may fall out of a holder designed for longer instruments, and larger instruments may not fit into a holder designed for shorter instruments. Further, the protective end wall 120 eliminates the need for a hard cover or folding guard, and protects the head portion 137 of the dental burs 135 from being damaged, as well as helps to protect from injury.

Base portion 105 may further include interlocking keys 140. Interlocking keys 140 are preferably disposed one at a first side and one at an opposing second side of base portion 105. In one example, one of interlocking keys 140 may be configured as a female key and the other, on the opposing side, may be configured as a male key, such that multiple bur holders 100 may be interlocked together in a serial fashion. In one example, interlocking keys 140 are disposed on their respective opposing sides where the center ridge 125 is disposed in base portion 105. Interlocking keys 140 may be at least partially disposed at end most portions of center ridge 125. Interlocking keys 140 are preferably configured, such that when multiple holders 100 are interlocked together the center ridges 125 of the holders 100 are substantially aligned. While interlocking keys 140 are described above as male/female connectors, any suitable mechanism, connector, or technique may be used to connect multiple holders 100, and are considered to be within the scope of the invention.

In another embodiment, holders 100 may be of various colors. Holders 100 may for example be color-coded to indicate use with various procedures or set-ups. For example, a holder 100 holding dental burs 135 may be color-coded to a particular procedure, thereby allowing the dentist or hygienist to easily identify what tools are needed for a particular procedure. In instances where multiple procedures are to be completed on a patient, multiple holders 100 may be interlocked together in the order to be used and even color-coded.

Referring to FIGS. 10 and 11, in operation, a user may retrieve a desired dental bur 135 from the holder 100 by pressing down on a side portion of the desired dental bur 135 with the head portion 137, with an approach substantially perpendicular to the axis of the dental bur 135. For example, the user would press down on a portion of the desired dental bur 135 at a point between the head portion 137 and the center ridge 125. By pressing down on the side portion of the dental bur 135 with the head portion 137, the other end of the dental bur 135, stem portion 139 (the non-working/cutting end), extends upward and the user picks up the dental bur 135 by the stem portion 139. The fulcrum design, enabled by the center ridge 125, causes the stem portion 139 of the dental bur 135 to flip up, making it easy to pick up from the non-working/cutting end thereby avoiding the potential of injury to one's self by the working/cutting end of the dental bur 135.

The holder 100 may include dimensions as identified in FIGS. 13 and 14. However, it should be understood that the dimensions identified in FIGS. 13 and 14 are examples only, and the dimensions may vary plus or minus from those shown without departing from the scope of the invention.

Further, holder 100 is discussed above with reference to dental instruments, e.g., dental burs; however, this is for example only, and holder 100 use with other instruments, such as, but not limited to surgical instruments are contemplated herein, without departing from the scope of the invention.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

That which is claimed:

1. A holder for medical instruments, comprising:
    a. a body, the body comprising a first surface and a second surface, wherein the first surface comprises a first edge, a second edge, a third edge, and a fourth edge about its periphery;
    b. a ridge formed at about a mid-point of the first surface of the body and extending along a length thereof;
    c. a wall portion formed along a length of only the first edge of the first surface of the body and extending vertically therefrom, wherein the wall portion is parallel to and spaced apart from the ridge; and
    d. a plurality of grooves formed in the ridge.

2. The holder of claim 1 wherein the holder comprises one of a flexible or semi-flexible material.

3. The holder of claim 1 wherein the second surface is substantially flat.

4. The holder of claim 1 wherein the ridge and the wall portion extend vertically upward from the first surface and are of substantially the same height.

5. The holder of claim 1 wherein the plurality of grooves are configured to accept a stem portion of a medical instrument and retain the medical instrument therein in a substantially horizontal position relative to the first surface.

6. The holder of claim 1 wherein a bottom most portion of the plurality of grooves is spaced a distance above the first surface.

7. The holder of claim 6 wherein the grooves are configured to retain a medical instrument in a horizontal position relative to the first surface such that a mid-portion of the medical instrument is supported in one of the grooves while a working end portion of the medical instrument is elevated a distance above the first surface, and wherein the retained medical instrument is orientated substantially parallel with the first surface and perpendicular relative to the ridge and the wall portion.

8. The holder of claim 7 wherein when retained in one of the grooves the working end portion of the medical instrument is proximate to a vertical face of the wall portion.

9. The holder of claim 1 wherein the plurality of grooves comprises a material comprising sufficient elasticity to releasable grip a medical instrument retained therein.

10. The holder of claim 1 further comprising one or more interlocking structures disposed at one or both of a first end of the body and a second end of the body opposing the first end.

11. The holder of claim 10, wherein the body comprises a first one of the one or more interlocking structures at the first end of the body and second one of the one or more interlocking structures at the second end of the body.

12. The holder of claim 11, wherein the first one of the one or more interlocking structures is configured as a female interlocking structure and the second one of the one or more interlocking structures is configured as a corresponding male interlocking structure.

13. The holder of claim 11, wherein the first one of the one or more interlocking structures and the second one of the one or more interlocking structures are disposed at the first end and the second end of the body respectively, such that they are substantially aligned with the ridge.

14. The holder of claim 13, wherein when multiple bodies are interlocked together the ridge of each of the interlocked bodies are substantially aligned.

15. The holder of claim 11, wherein multiple bodies are interlockable together via the one or more interlocking structures.

16. The holder of claim 15, wherein the bodies are color coded.

17. The holder of claim 11, wherein the first one of the one or more interlocking structures of a first holder is configured to interlock with the second one of the one or more interlocking structure of a second holder.

18. The holder of claim 1 wherein the ridge is made of one of a flexible or semi-flexible material.

19. A method of removing a medical instrument from a holder, the method comprising:
 a. providing a holder, the holder comprising:
  i. a body, the body comprising a first surface and a second surface, wherein the first surface comprises a first edge, a second edge, a third edge, and a fourth edge about its periphery;
  ii. a ridge formed at about a mid-point of the first surface of the body and extending along a length thereof;
  iii. a wall portion formed along a length of only the first edge of the first surface of the body and extending vertically therefrom, wherein the wall portion is parallel to and spaced apart from the ridge;
  iv. a plurality of grooves formed in the first ridge; and
  v. one or more medical instruments retained in one or more of the plurality of grooves;
 b. selecting one of the one or more medical instruments;
 c. pressing down on a first end of the selected medical instrument that is more proximate to the wall portion;
 d. grasping a second end of the selected medical instrument opposite that of the first end that extends upward upon pressing down on the first end; and
 e. pulling up on the second end to remove the selected medical instrument fully from the holder.

20. A method of storing a medical instrument in a holder, the method comprising:
 a. providing a holder, the holder comprising:
  i. a body, the body comprising a first surface and a second surface, wherein the first surface comprises a first edge, a second edge, a third edge, and a fourth edge about its periphery;
  ii. a ridge formed at about a mid-point of the first surface of the body and extending along a length thereof;
  iii. a wall portion formed along a length of only the first edge of the first surface of the body and extending vertically therefrom, wherein the wall portion is parallel to and spaced apart from the ridge; and
  iv. a plurality of grooves formed in the first ridge;
 b. selecting one of one or more medical instruments to be stored in the holder;
 c. inserting a stem portion of the selected medical instrument into one of the plurality of grooves, such that the selected medical instrument is substantially perpendicular to the ridge and a working end of the selected medical instrument is proximate to the wall portion; and
 d. pressing down on the stem portion of the selected medical instrument to retain the selected medical instrument in the groove, such that when fully retained therein a portion of the stem of the selected medical instrument is cradled in the groove, the selected medical instrument is substantially parallel with the first surface, and the working end of the selected medical instrument is elevated a distance above the first surface.

* * * * *